(12) United States Patent
Burns

(10) Patent No.: US 9,605,745 B1
(45) Date of Patent: Mar. 28, 2017

(54) REMOVABLE PROTECTIVE COVER FOR MOTORCYLE AND ALL-TERRAIN VEHICLE ENGINES

(71) Applicant: Andre Kevin Burns, Grand Rapids, MI (US)

(72) Inventor: Andre Kevin Burns, Grand Rapids, MI (US)

( * ) Notice: Subject to any disclaimer, the term of this patent is extended or adjusted under 35 U.S.C. 154(b) by 0 days.

(21) Appl. No.: 14/629,064

(22) Filed: Feb. 23, 2015

Related U.S. Application Data

(60) Provisional application No. 61/966,461, filed on Feb. 24, 2014.

(51) Int. Cl.
G05G 25/00 (2006.01)
F16H 57/031 (2012.01)
F16B 35/00 (2006.01)

(52) U.S. Cl.
CPC ............ F16H 57/031 (2013.01); F16B 35/00 (2013.01)

(58) Field of Classification Search
CPC ............................... F16H 57/031; F16B 35/00
See application file for complete search history.

(56) References Cited

U.S. PATENT DOCUMENTS

| 23,551 | A | | 8/1894 | Park | |
|---|---|---|---|---|---|
| 2,695,725 | A | * | 11/1954 | Chatfield | F16H 57/029 220/327 |
| 4,138,132 | A | | 2/1979 | Doyle | |
| 4,474,077 | A | * | 10/1984 | Debelius | B25F 5/02 173/145 |
| 4,793,457 | A | | 12/1988 | Siewert et al. | |
| 6,206,604 | B1 | | 3/2001 | Dembowsky et al. | |
| 6,398,683 | B1 | * | 6/2002 | Fukuda | B62J 13/00 180/219 |
| 6,722,338 | B2 | | 4/2004 | Okano et al. | |
| 6,896,278 | B1 | * | 5/2005 | Hepburn | B62J 35/00 280/304.3 |
| 7,144,030 | B2 | * | 12/2006 | Buell | B62J 27/00 180/219 |
| 7,305,962 | B2 | | 12/2007 | Nonogaki et al. | |
| 7,322,768 | B2 | | 1/2008 | Ochiai et al. | |
| 7,343,705 | B2 | | 3/2008 | Kruse | |
| D595,190 | S | | 6/2009 | Madden | |
| 8,429,840 | B2 | | 4/2013 | Mottola | |
| 9,156,512 | B2 | * | 10/2015 | Ono | B62J 13/00 |
| 2005/0247501 | A1 | | 11/2005 | Baker | |

(Continued)

FOREIGN PATENT DOCUMENTS

| DE | 19630003 A1 | * | 1/1998 | ........... A47B 77/022 |
|---|---|---|---|---|
| DE | 102011089006 A1 | * | 6/2013 | ........... F16H 57/031 |

*Primary Examiner* — Vicky Johnson
(74) *Attorney, Agent, or Firm* — Price Heneveld LLP

(57) ABSTRACT

A removable protective cover for engines and/or transmissions includes a central portion and a flexible peripheral flange that extends transversely from the central portion. The peripheral flange includes an engagement surface formed by a groove or other suitable feature on an inner side of the peripheral flange. A plurality of teardrop shaped washers or retainers have protruding portions that engage the groove to removably retain the cover on the engine. At least a portion of the peripheral flange comprises an elastomeric material such that the removable cover can be installed and removed by flexing the peripheral flange to cause the teardrop shaped washers to engage and disengage the groove.

11 Claims, 7 Drawing Sheets

(56) References Cited

U.S. PATENT DOCUMENTS

| | | |
|---|---|---|
| 2006/0160646 A1 | 7/2006 | Jaszkowiak |
| 2008/0128192 A1 | 6/2008 | Kruse |
| 2010/0300398 A1 | 12/2010 | Weymouth, Jr. |
| 2011/0251324 A1 | 10/2011 | Banks |
| 2014/0292026 A1 | 10/2014 | Salvaggio, Jr. |

* cited by examiner

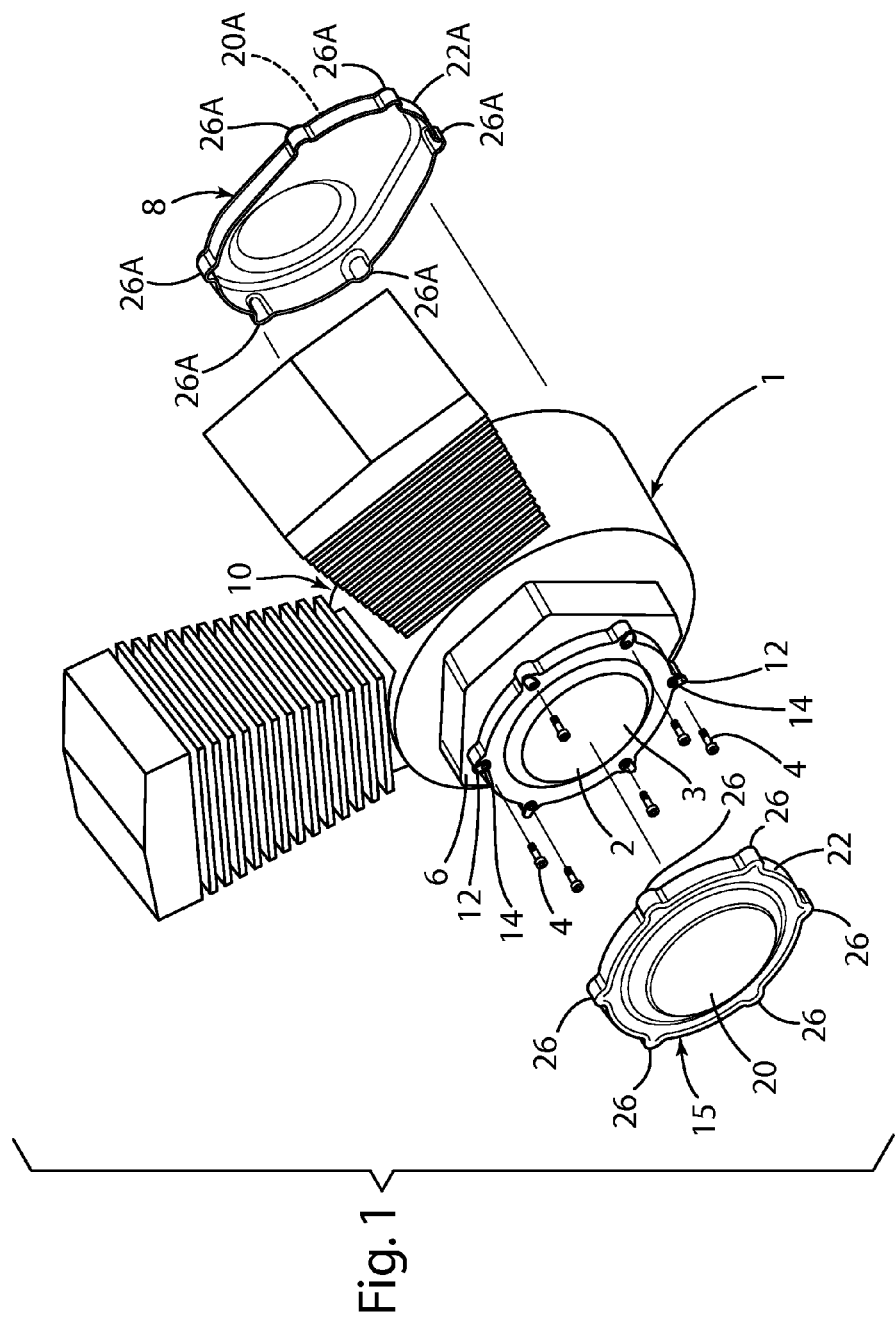

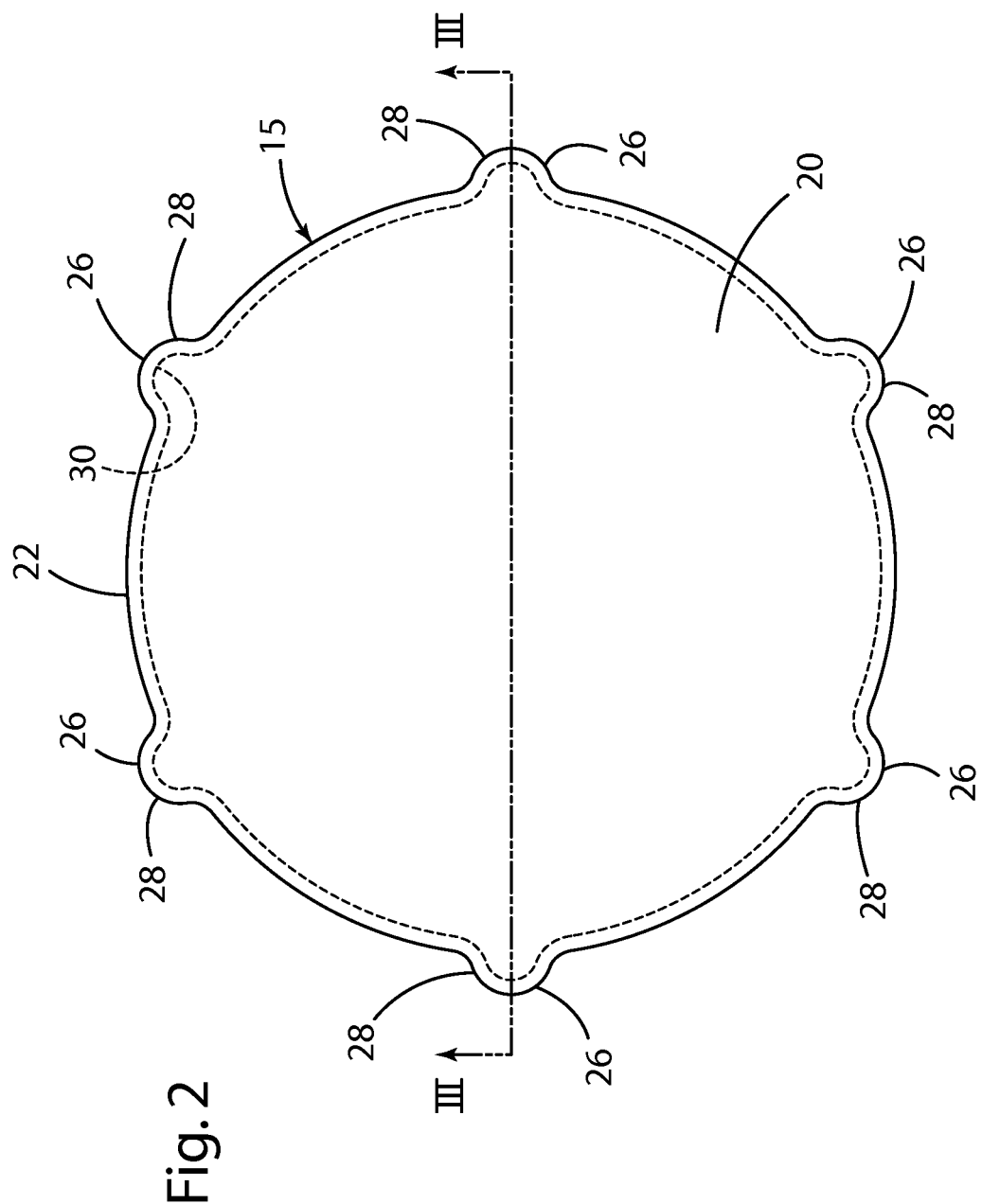

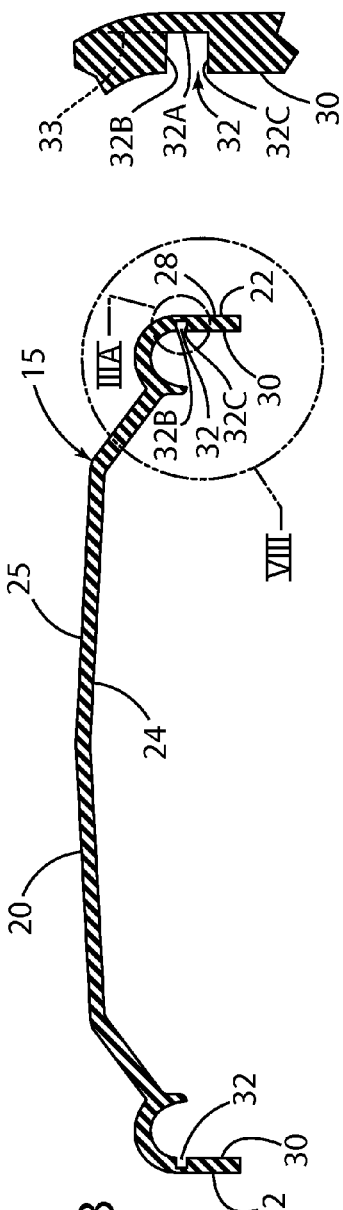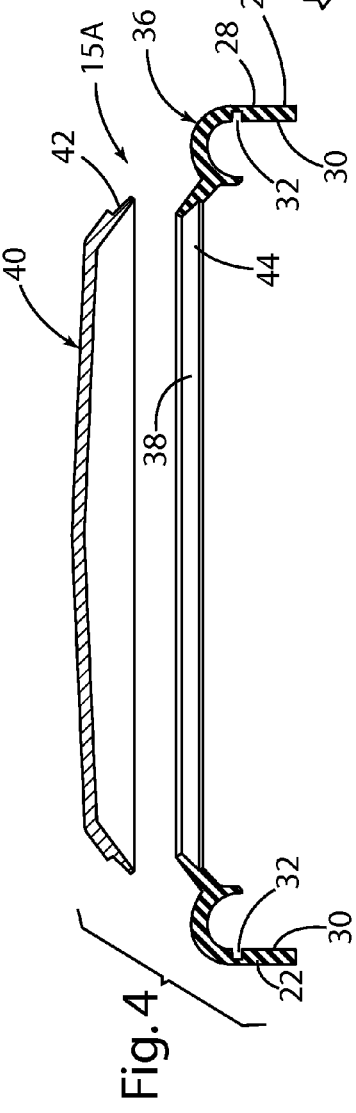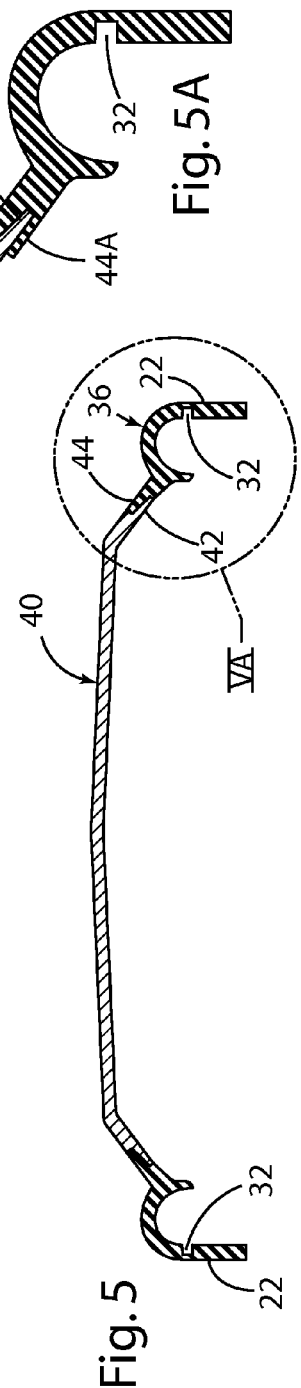

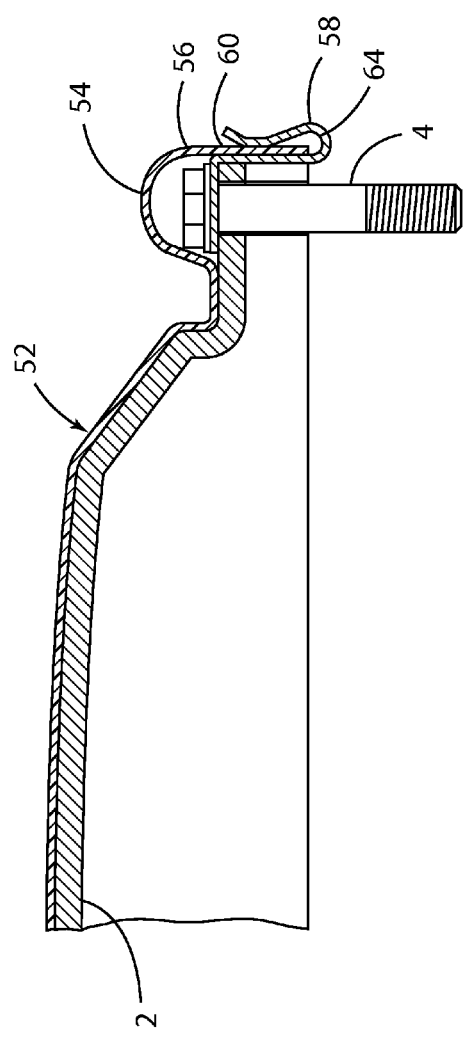
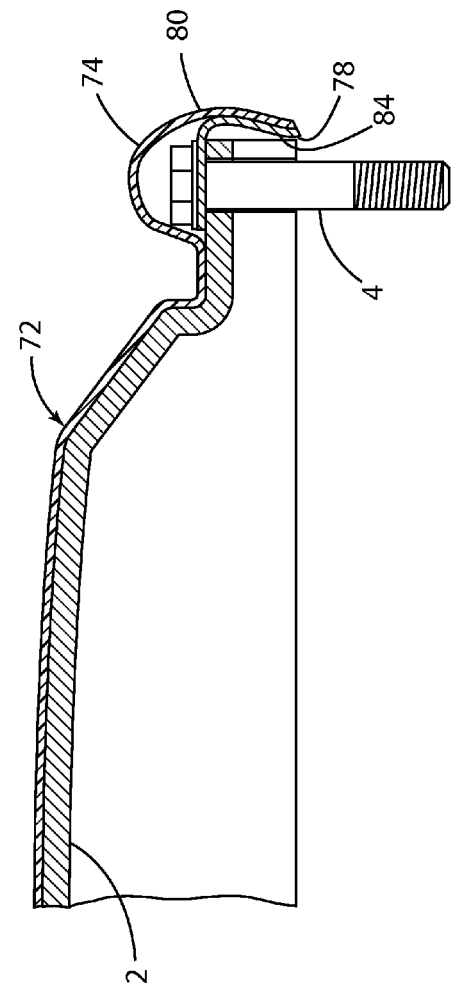

REMOVABLE PROTECTIVE COVER FOR MOTORCYLE AND ALL-TERRAIN VEHICLE ENGINES

CROSS-REFERENCE TO RELATED APPLICATION

This application claims the benefit of U.S. Provisional Application No. 61/966,461 filed on Feb. 24, 2014, entitled, "MOTOR CASE COVER AND CASE COVER PROTECTORS: REUSABLE AND DISPOSABLE. MOTORCYCLE, DIRT BIKE, & ATV'S," the entire contents of which are incorporated herein by reference.

BACKGROUND OF THE INVENTION

Motorcycles, dirt bikes, All Terrain Vehicles (ATVs) and the like typically include one or more covers that protect various components such as the motor ignition and/or clutch. These covers are typically rigid metal "hard" covers that are attached to the engine utilizing threaded fasteners. The covers may be sealed utilizing a gasket.

These types of covers may become scratched or damaged from a rider's boots, branches, or other objects encountered during use of the motorcycle or ATV. The original metal covers can be replaced when damaged. However, replacement covers may be costly, and removing and reinstalling the threaded fasteners each time the covers are replaced requires significant time and effort. Furthermore, the threaded openings that receive the threaded fasteners may become stripped or damaged if the covers are replaced frequently.

SUMMARY OF THE INVENTION

One aspect of the present invention is a removable protective cover kit for engines and/or transmissions having hard covers that are secured with threaded fasteners. The removable protective cover kit includes a removable cover comprising a central portion and a peripheral flange that extends transversely relative to the central portion. The removable cover includes at least one groove on an inner side of the peripheral flange. The kit further includes a plurality of retainers having an opening therethrough. The retainers have an oblong shape such that the retainers can be secured to a hard cover utilizing threaded fasteners with an outer portion of the retainers projecting outwardly away from the hard cover. At least a portion of the peripheral flange comprises an elastomeric material such that the removable cover can be installed and removed by flexing the peripheral flange to cause the outer portion of the retainers to engage and disengage the outer portions of the retainers.

Another aspect of the present invention is a method of securing a removable cover to an engine having at least one hard cover that is secured to the engine by threaded fasteners that extend through openings in the hard cover. The method includes providing a plurality of retainers, each retainer having an oblong shape and an opening therethrough. The method includes removing the threaded fasteners securing the hard cover to the engine. The retainers are then secured to the engine using threaded fasteners extending through the openings of the retainers, with an outer portion of each retainer extending outwardly away from the hard cover. The method further includes providing a removable cover comprising a central portion and a peripheral flange that extends transversely relative to the central portion. The removable cover includes at least one groove on an inner side of the peripheral flange. At least a portion of the peripheral flange comprises an elastomeric material. The method further includes installing the removable cover over the hard cover by flexing the peripheral flange and positioning the outer portions of the retainers in the at least one groove on the inner side of the peripheral flange of the removable cover.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is an exploded perspective view showing a motorcycle or ATV engine, a hard cover, and a removable cover;

FIG. 2 shows a removable protective cover according to one aspect of the present invention;

FIG. 3 is a cross sectional view of the cover of FIG. 2 taken along the line III-Ill;

FIG. 3A is an enlarged fragmentary view of a portion of the cover of FIG. 3;

FIG. 4 is an exploded cross sectional view of a protective cover according to another aspect of the present invention;

FIG. 5 is a cross sectional view of the cover of FIG. 4 in an assembled condition;

FIG. 5A is a fragmentary view of a portion of a cover according to another aspect of the present invention;

FIG. 14 shows the clip of FIGS. 12 and 13 retaining a thin flexible cover according to another aspect of the present invention;

FIG. 17 is a cross sectional view showing the clip of FIGS. 15 and 16 retaining a thin flexible cover.

DETAILED DESCRIPTION

Figure 6:
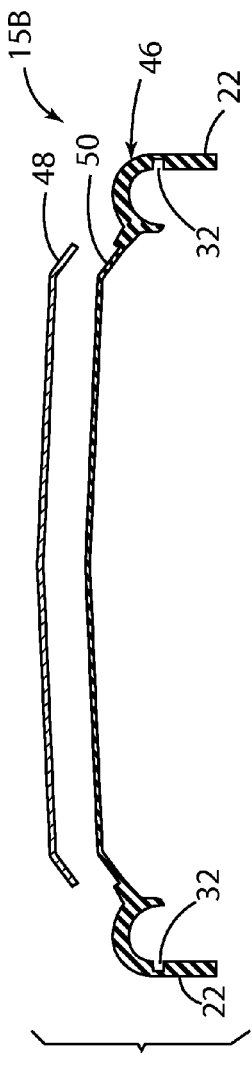
FIG. 6 is an exploded cross sectional view of a removable protective cover according to another aspect of the present invention.

With reference to FIG. 1, an engine 1 of the type used in motorcycles, ATVs, or the like includes one or more hard covers 2 that are secured to the engine utilizing threaded fasteners 4 in a known manner. The hard cover 2 is typically a rigid metal member that may be attached to the engine 1 to cover a clutch side 6 of engine 1. The engine 1 may also include an ignition side hard cover (not shown) on ignition side 10 of engine 1. Various types of engines 1 that include one or more hard covers are generally known in the art, and the present invention is not limited to any particular engine and/or hard cover configuration.

Figure 9:
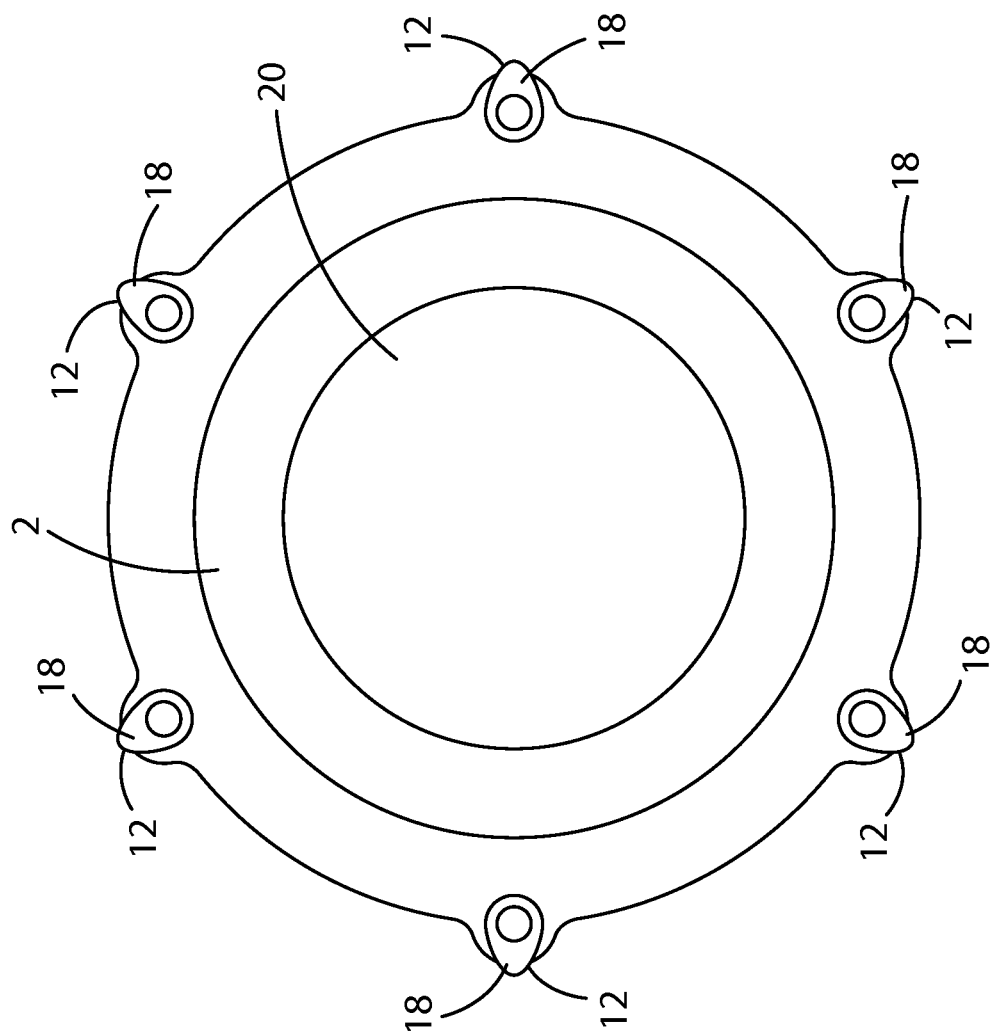
FIG. 9 is a partially fragmentary view of a hard cover with teardrop shaped washers in place.
Figure 10:
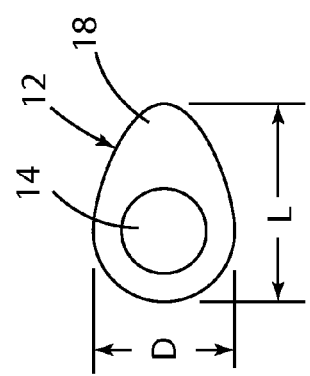
FIG. 10 shows a teardrop shaped washer.
Figure 11:
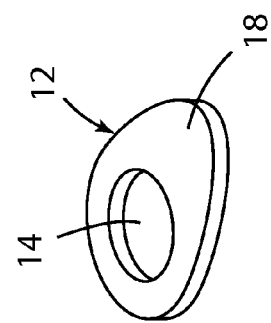
FIG. 11 is an isometric view of a teardrop shaped washer.

A removable protective cover 15 according to the present invention may be installed over the hard cover 2 and/or the ignition side hard cover. As discussed in more detail below, the threaded fasteners 4 utilized to hold the hard cover 2 in place may be removed, and retainers such as teardrop shaped washers 12 (FIGS. 10 and 11) may be installed in place of the original washers by inserting the threaded fasteners 4 through openings 14 in the teardrop shaped washers 12. As shown in FIGS. 10 and 11, the teardrop shaped washers 12 have an oblong or teardrop shape, and include a portion 18 that extends outwardly away from central portion 20 of hard cover 2 when installed (FIG. 9). In a preferred embodiment, the large ends of teardrop shaped washers 12 have a diameter "D" (FIG. 10) of about 10 mm, a length "L" of about 14 mm, and opening 14 has a diameter of about 6 mm. However, the retainers/washers 12 are not limited to these specific sizes, nor are they limited to the specific shape shown in FIGS. 10 and 11.

With reference to FIG. 2, a removable protective cover 15 according to one aspect of the present invention includes a central portion 20 and a peripheral flange 22 that extends transversely relative to central portion 20. The central portion 20 is preferably configured to have an inner surface 24 (FIG. 3) that closely matches the outer surface of hard cover 2. The peripheral flange 22 may include a plurality of protruding portions 26 that have generally cylindrical outer and inner surfaces 28 and 30, respectively. Grooves 32 (FIG. 3) are formed in the inner surfaces 30 of each protruding portion 26 of peripheral flange 22. In the illustrated example (FIG. 2), the peripheral flange 22 of cover 15 is generally circular in shape, and cover 15 is generally bowl-shaped to match the shape of hard cover 2. However, it will be understood that the protective cover of the present invention is not limited to a specific shape. For example, a removable cover 8 (FIG. 1) for the ignition side 10 of engine 1 may have a non-circular peripheral flange 22A and a central portion 20A that fit closely around a non-circular ignition side hard cover. Removable cover 8 may include protruding portions 26A that are substantially similar to protruding portions 26 of cover 15, the protruding portions 26 including grooves 32 or other feature forming retaining surfaces 32C (FIG. 3A) to retain cover 8 utilizing retainers such as teardrop shaped washers 12.

Figure 8:
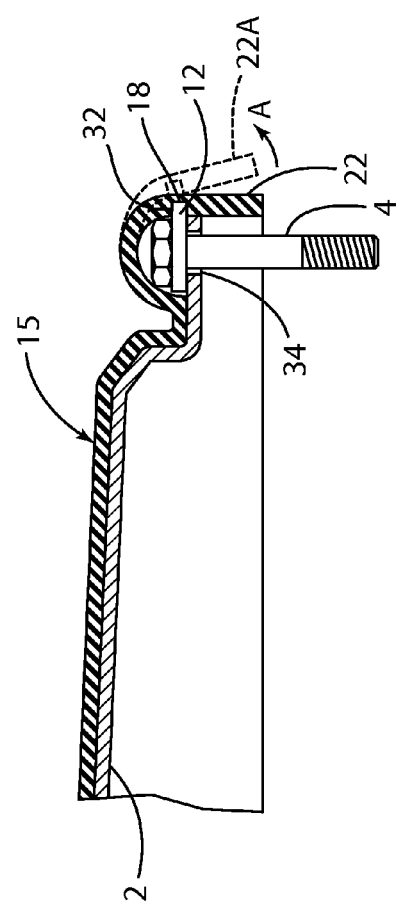
FIG. 8 is a fragmentary enlarged portion of the cover of FIG. 3 showing the cover in engagement with a teardrop washer.

With further reference to FIG. 8, after teardrop shaped washers 12 are installed utilizing treaded fasteners 4 extending through openings 34 of hard cover 2, the removable protective cover 15 can be installed by flexing the peripheral flange 22 outwardly as shown by the arrow "A" to the flexed shape/position 22A and inserting/engaging the projecting portions 18 of teardrop shaped washers 12 into grooves 32. In general, installing removable protective cover 15 involves removing threaded fasteners 4, followed by re-inserting threaded fasteners 4 with teardrop shaped washers 12 positioned in place of the original washers. Typically, the hard cover 2 does not need to be removed. The removable protective cover 15 is then flexed and pushed onto the engine 1 over the hard cover 2.

Referring to FIGS. 3 and 3A, groove 32 may be generally U-shaped and include a base surface 32A, and first and second opposite side surfaces 32B and 32C, respectively, that extend parallel to one another. The second side surface 32C comprises an engagement surface that engages the extension or protrusion 18 of each washer 12 to retain the protective cover 15 on engine 1 over hard cover 2. It will be understood that a groove is not required to form engagement surface 32C. Inner surface 30 may extend upwardly as shown by dashed line 33 (FIG. 3A) such that engagement surface 32C comprises a step, and no groove 32 is present. In a preferred embodiment, grooves 32 are only formed on inside surfaces 30 of protrusions 26. However, grooves 32 and/or retaining surfaces 32A may extend continuously around the entire inner surface of flange 22. Also, grooves 32 could comprise slots or openings that extend through flange 22. Teardrop shaped washers 16 could have increased length such that outer portion 18 extends through the slot and protrudes beyond outer surface 28 of flange 22. Thus, cover 15 could have virtually any shape/configuration that is capable of engaging retainers/washers 16 to retain cover 15.

Referring again to FIG. 3, the removable protective cover 15 may comprise a single, homogenous structure that is molded from an elastomeric material such as rubber. The outer surface 25 of central portion 20 of cover 15 may be flat, slightly convex, or other shape as required for a particular application. As discussed above, the inner surface 24 is preferably configured to fit closely against outer surface 3 of hard cover 2. The removable protective cover 15 can be removed by grasping the flange 22 of cover 15, and flexing the flange outwardly as indicated by the arrow "A" (FIG. 3) to disengage the outer portion 18 of teardrop shaped washer 12 from the grooves 32. The cover 15 can then be pulled off manually, without the use of tools. If the cover 15 becomes damaged, another cover 15 of the same configuration can be quickly and easily installed over the hard cover 2 by snapping the replacement cover 15 onto the teardrop shaped washers 12 in the manner discussed above. Thus, once the teardrop shaped washers 12 are installed, a series of removable protective covers 15 can be installed and removed without the use of tools as the covers 15 become damaged.

With further reference to FIG. 4, a protective cover 15A according to another aspect of the present invention includes a ring-shaped first portion 36 having an enlarged central opening 38. The first portion 36 is made of rubber or other elastomeric material, and includes a flange 22 and groove 32 that are substantially identical to the cover 15 of FIG. 3. As shown in FIG. 5, when assembled, cover 15A also includes a center piece 40 having an edge 42 that engages edge 44 of first piece 36. The center piece 40 may comprise metal, polymer, rubber, or other suitable material. The edge portions 42 and 44 may be sealed and adhesively interconnected using an adhesive or other suitable connecting arrangement. In a preferred embodiment, the center piece 40 comprises metal that is relatively rigid, and has a significantly harder, more scratch resistant surface than does the first portion 36.

With further reference to FIG. 5A first portion 36 may, alternatively, include a second edge portion 44A that is spaced apart from first edge portion 44 to form a groove 45 that receives edge 42 of center piece 40. Adhesives and/or mechanical connectors (not shown) may be utilized to secure center piece 40 to first portion or piece 36.

Figure 7:
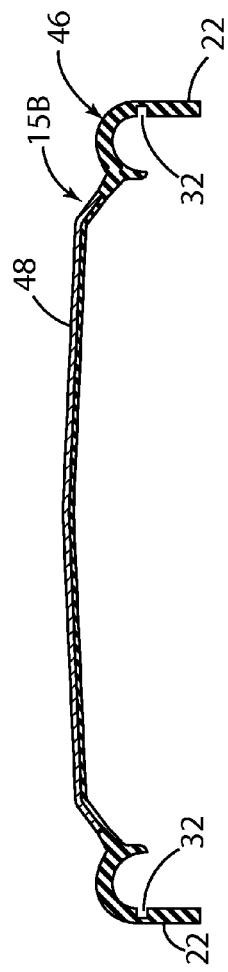
FIG. 7 is a cross sectional view of the cover of FIG. 6 in an assembled condition.

With further reference to FIGS. 6 and 7, a cover 15B according to another aspect of the present invention includes a first portion 46 that is molded from rubber or other elastomeric material, and a center piece 48 that may comprise metal, plastic, or other material. The first portion 46 includes a region 50 having reduced thickness, and the center piece 50 fits in the region 50 when assembled (FIG. 7). The center piece 50 may be secured to the first portion 46 by adhesives or other suitable connecting arrangement. The center piece 48 is preferably made of a material that is scratch resistant, and significantly harder than the rubber or other material utilized to form the first portion 46.

Figure 12:
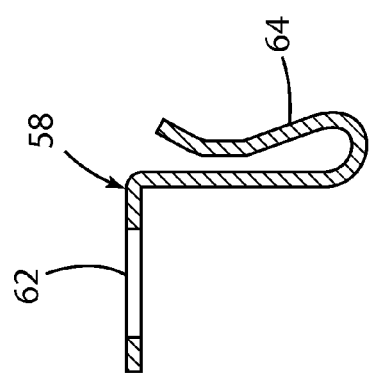
FIG. 12 shows a clip according to another aspect of the present invention.
Figure 13:
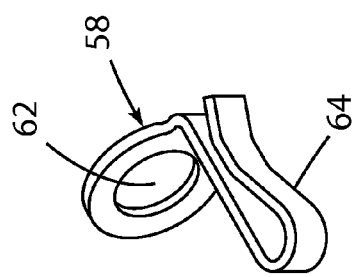
FIG. 13 shows the clip of FIG. 12.

With further reference to FIGS. 12-14, a cover 52 according to another aspect of the present invention comprises a thin sheet of molded polymer material that is configured to fit closely over an existing hard cover 2. The cover 52 includes raised portions 54 that form protrusions 56 that fit over threaded fasteners 4. Spring clips 58 are secured to the engine 1 utilizing threaded fasteners 4, and the spring clips 58 engage flange portions 60 of cover 52 to thereby retain the cover 52 on the engine 1. Spring clips 58 include an opening 62 that receives threaded fastener 4, and a U-shaped portion 64. The cover 52 is preferably made of a thin polymer material such as vacuum formed clear polymer. Because the cover 52 is retained by spring clips 58, the cover 52 does not necessarily need to be made from a flexible elastomeric material. In particular, the flange 60 can be inserted into the spring clips 58 without significant flexing of the flange 60.

Figure 15:
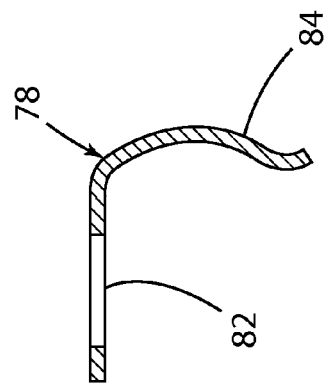
FIG. 15 shows another clip according to another aspect of the present invention.
Figure 16:
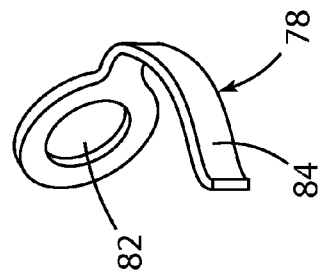
FIG. 16 is an isometric view of the clip of FIG. 15.

With further reference to FIGS. 15-17, a cover 72 according to another aspect of the present invention is molded from a thin polymer material, and includes a peripheral flange 80. Spring clips 78 are secured utilizing threaded fasteners 4 which extend through openings 82 of spring clips 78. Each spring clip 78 includes a flexible curved arm 84 that engages a flange portion 80 of cover 72 to thereby removably retain the cover 72 over an existing hard cover 2.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A removable protective cover kit for engines and/or transmissions having hard covers that are secured with threaded fasteners, the removable protective cover kit comprising:
   a removable cover comprising a central portion having an inner surface that faces in an inner direction, and an outer surface that faces in an outer direction that is opposite the inner direction, the removable cover including a peripheral flange that extends transversely inward relative to the central portion wherein the removable cover includes a retaining surface on an inner side of the peripheral flange wherein the retaining surface faces in the outward direction;
   a plurality of retainers, each having an opening therethrough, wherein the retainers have an oblong shape such that the retainers can be secured to an engine adjacent to a hard cover utilizing a threaded fastener with an outer portion of the retainers projecting outwardly away from a hard cover; and wherein:
   at least a portion of the peripheral flange comprises an elastomeric material having sufficient flexibility to permit flexing of the peripheral flange whereby the retaining surface engages the outer portions of the retainers during assembly to retain the removable cover, and disengages the outer portions of the retainers during disassembly to permit removal of the removable cover.

2. The removable protective cover kit of claim 1, wherein: the retaining surface comprises a side surface of a groove.

3. The removable protective cover kit of claim 1, wherein: the central portion of the cover comprises an elastomeric material.

4. The removable protective cover kit of claim 3, wherein: the central portion of the cover further comprises scratch-resistant material disposed over the elastomeric material.

5. The removable protective cover kit of claim 1, wherein: the elastomeric material forms an outer ring defining a central opening; and including:
   a scratch-resistant shield made of a scratch-resistant material that is significantly harder than the elastomeric material, wherein the shield is secured to the outer ring and extends across the central opening of the ring.

6. The removable protective cover kit of claim 1, wherein: the peripheral flange of the cover comprises a rubber material.

7. The removable protective cover kit of claim 6, wherein: the central portion of the cover comprises a rubber material.

8. The removable protective cover kit of claim 7, wherein: the central portion of the cover has a convex surface.

9. The removable protective cover kit of claim 1, wherein: the cover is generally bowl-shaped.

10. The removable protective cover kit of claim 1, wherein:
   the retainers comprise washers having a teardrop-shaped perimeter.

11. A removable protective cover kit for engines and/or transmissions having hard covers that are secured with threaded fasteners, the removable protective cover kit comprising:
   a removable cover comprising a central portion and a peripheral flange that extends transversely relative to the central portion wherein the removable cover includes a retaining surface on an inner side of the peripheral flange;
   a plurality of retainers, each having an opening therethrough, wherein the retainers have an oblong shape such that the retainers can be secured to an engine adjacent to a hard cover utilizing a threaded fastener with an outer portion of the retainers projecting outwardly away from a hard cover;
   at least a portion of the peripheral flange comprises an elastomeric material having sufficient flexibility to permit flexing of the peripheral flange whereby the retaining surface engages the outer portions of the retainers during assembly to retain the removable cover, and disengages the outer portions of the retainers during disassembly to permit removal of the removable cover, and wherein:
   the flange includes a plurality of outwardly-extending portions that are configured to fit over the heads of threaded fasteners, each outwardly-extending portion having a concave inner surface, and wherein the retaining surface comprises grooves that are formed in the concave inner surfaces.

* * * * *